(12) United States Patent
Niu et al.

(10) Patent No.: US 9,459,714 B2
(45) Date of Patent: Oct. 4, 2016

(54) ELECTRONIC DEVICE WITH MULTIPLE DISPLAY MODES AND DISPLAY METHOD OF THE SAME

(71) Applicants: Beijing Lenovo Software Ltd., Haidian District, Beijing (CN); Lenovo (Beijing) Co., Ltd., Beijing (CN)

(72) Inventors: Quan Niu, Beijing (CN); Guang Yang, Beijing (CN); Su Fan, Beijing (CN); Ke Shang, Beijing (CN)

(73) Assignees: BEIJING LENOVO SOFTWARE LTD., Haidian District, Beijing (CN); LENOVO (BEIJING) CO., LTD., Haidian District, Beijing (CN)

( * ) Notice: Subject to any disclaimer, the term of this patent is extended or adjusted under 35 U.S.C. 154(b) by 495 days.

(21) Appl. No.: 13/760,457

(22) Filed: Feb. 6, 2013

(65) Prior Publication Data

US 2013/0201101 A1  Aug. 8, 2013

(30) Foreign Application Priority Data

Feb. 7, 2012  (CN) .......................... 2012 1 0026767

(51) Int. Cl.
*G09G 5/00* (2006.01)
*G06F 3/041* (2006.01)
*G06F 1/16* (2006.01)
*G06F 3/14* (2006.01)

(52) U.S. Cl.
CPC ............ *G06F 3/041* (2013.01); *G06F 1/1616* (2013.01); *G06F 1/1641* (2013.01); *G06F 1/1647* (2013.01); *G06F 1/1677* (2013.01); *G06F 3/1423* (2013.01); *G09G 2380/02* (2013.01)

(58) Field of Classification Search
None
See application file for complete search history.

(56) References Cited

U.S. PATENT DOCUMENTS

2002/0094846 A1* 7/2002 Kishimoto et al. ........... 455/566
2010/0060548 A1* 3/2010 Choi et al. .................... 345/1.3

(Continued)

FOREIGN PATENT DOCUMENTS

| CN | 101393514 | 3/2009 |
|---|---|---|
| KR | 10-2011-0133861 | 12/2011 |
| KR | 1020110133861 | * 12/2011 |

OTHER PUBLICATIONS

First Office Action dated Oct. 13, 2015 out of corresponding Chinese priority Application No. 201210026767.2 (15 pages including English translation).
Second Office Action dated Apr. 18, 2016 out of corresponding Chinese priority Application No. 201210026767.2 (19 pages including English translation).

(Continued)

*Primary Examiner* — Ilana Spar
*Assistant Examiner* — Kirk Hermann
(74) *Attorney, Agent, or Firm* — Brinks Gilson & Lione; G. Peter Nichols (57) ABSTRACT

An electronic device having a plurality of display modes is described. The electronic device includes a first and a second display screen, wherein the second display screen is a foldable display screen. The display method includes detecting a screen state of the second display screen; displaying in the first display mode when the screen state is a first state; displaying in the second display mode when the screen state is a second state, wherein the first display screen is divided into a first part shaded by the second display screen and a second part. In the second display mode, the first picture is displayed using a combination of at least part of the second display screen and the second part of the first display screen while a second picture is displayed on the at least part of the second display screen.

20 Claims, 4 Drawing Sheets

(56) References Cited

U.S. PATENT DOCUMENTS

2010/0182248 A1* 7/2010 Chun .......................... 345/173
2012/0069502 A1* 3/2012 Lauder et al. ........... 361/679.01
2012/0194448 A1* 8/2012 Rothkopf ..................... 345/173

OTHER PUBLICATIONS

Office Action dated Jul. 15, 2016 out of corresponding Chinese Application No. 201210026767.2 (17 pages including English translation).

* cited by examiner (A)

ELECTRONIC DEVICE WITH MULTIPLE DISPLAY MODES AND DISPLAY METHOD OF THE SAME

This application claims priority to Chinese patent application No. CN 201210026767.2 filed on Feb. 7, 2012, the entire contents of incorporated herein by reference.

The present disclosure relates to a combination of display modes of an electronic device, in particular to an electronic device with multiple display modes and a display method of the same.

BACKGROUND

At present, the application of a pad or tablet is increasingly wide. Products of a pad or tablet provided by a diversity of manufacturers are exactly similar in both structure and appearance.

Figure 1:
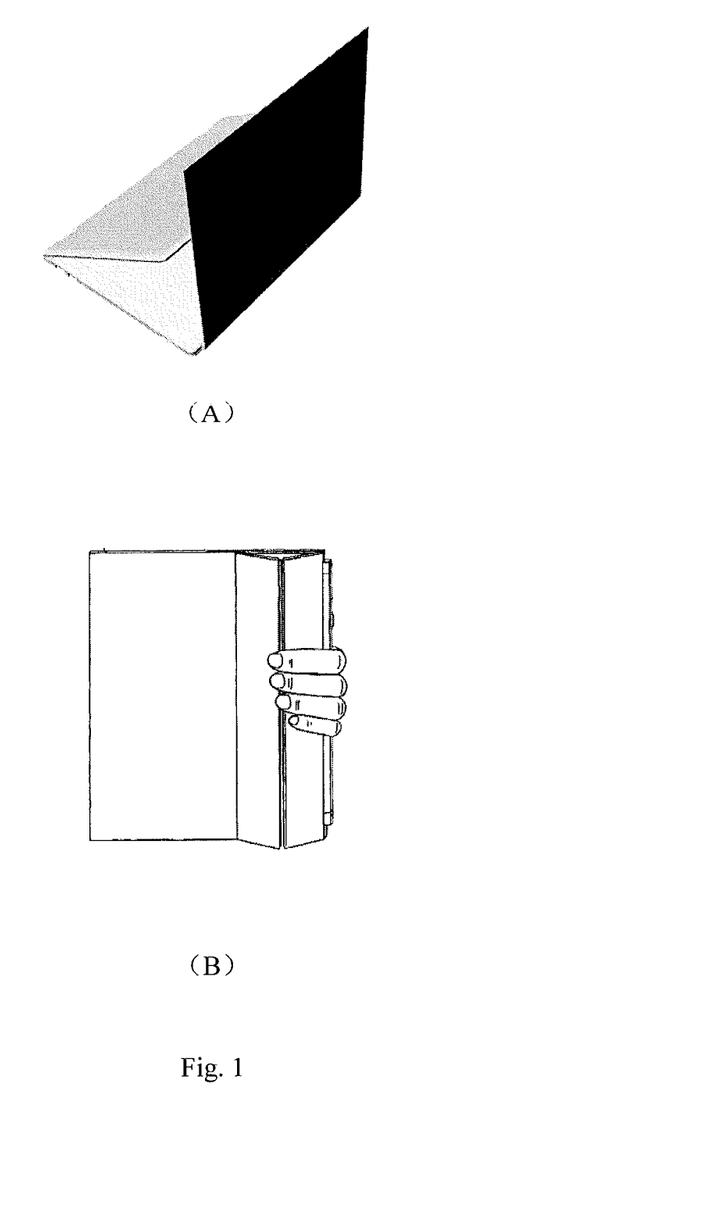
FIG. 1 is an illustrative drawing of the existing pad and its screen protective cover.

In the application, in order to protect a display screen of a pad, a display screen protective cover is always added to the pad, as shown in (A) of FIG. 1. The display screen protective cover can be a folding cover, as shown in (B) of FIG. 1.

However, the existing display screen protective cover provided for the pad mostly aims at protecting the display screen of the pad rather than functioning as displaying.

SUMMARY

According to the present disclosure, a pad is provided with multiple display modes. The pad has a first display screen and a second display screen. The first display screen is a primary display screen or a main display screen of the pad, and the second display screen is a foldable display screen, wherein a first display mode is to display on the first display screen but not display on the second display screen and a second display mode is to display using a combination of the first display screen and the second display screen, thus diversifying the application of the pad.

It should be known that the present disclose is proposed merely taking a pad as an example. As a matter of fact, the present disclosure can be further applied to electronic devices such as a smart phone, an electronic photo frame and a personal digital assistant and so forth. These electronic devices have a main display screen used for displaying.

According to one aspect of the present disclosure, provided is a display method applied to an electronic device having at least a first display mode and a second display mode and comprising a first display screen and a second display screen being a foldable display screen, comprising: detecting a screen state of the second display screen; displaying in the first display mode when the screen state indicates that the second display screen is in a first state, wherein a first picture is displayed on the first display screen; and displaying in the second display mode when the screen state indicates that the second display screen is in a second state. In the second state, the first display screen is divided into a first part and a second part, and the first part is shaded by the second display screen. In the second display mode, the first picture is displayed using a combination of at least part of the second display screen and the second part of the first display screen while a second picture is displayed on the at least part of the second display screen, and the second picture comprises a picture displayed on the first part of the first display screen if the second display screen is in the first state.

Preferably, the second display screen is a foldable flexible screen. Preferably, the second display screen is a foldable single-sided light emitting diode display screen or a foldable double-sided light emitting diode display screen.

Preferably, when the screen state indicates that the second display screen is in the second state, a part of the second display screen to be used for displaying is determined according to a folding state of the second display screen, and the second picture is displayed on the determined part to be used for displaying.

Preferably, the second display screen is an upside light emitting foldable single-sided display screen. The second display screen is folded as having a first part and a second part. The second state is that the first part and the second part of the second display screen are held in a form of ridge on the first display screen and the first part of the first display screen is shaded. The picture originally displayed on the first part of the first display screen is displayed on the second part of the second display screen.

Preferably, the second display screen is a downside light emitting foldable single-sided display screen. The second display screen is folded as having a first part and a second part. The second state is that the first part of the second display screen is overlapped on the first part of the first display screen and an included angle between the second part of the second display screen and the second part of the first display screen is equal to or greater than 90 degrees. The picture originally displayed on the first part of the first display screen is displayed on the second part of the second display screen.

Preferably, the first part and the second part of the second display screen are equal or unequal.

Preferably, the second display screen is an upside light emitting foldable single-sided display screen. The second display screen is folded as including a first part, a second part and a third part with an included angle of 60 degrees between each other and the third part of the second display screen shades the first part of the first display screen. The picture originally displayed on the first part of the first display screen is displayed on the second part of the second display screen.

Preferably, the second display screen is a downside light emitting foldable single-sided display screen. The second display screen is folded as including a first part, a second part and a third part with an included angle of 60 degrees between each other and the first part of the second display screen shades the first part of the first display screen. The picture originally displayed on the first part of the first display screen is displayed on the second part of the second display screen.

Preferably, the first part, the second part and the third part of the second display screen are equal or unequal.

According to another aspect of the present disclosure, provided is an electronic device having at least a first display mode and a second display mode, comprising a first display screen; a second display screen being a foldable display screen; a screen state detecting unit used for detecting a screen state of the second display screen; and a controlling unit used for controlling the electronic device to display in the first display mode when the screen state detecting unit detects that the screen state of the second display screen is in a first state and controlling the electronic device to display in the second display mode when the screen state detecting unit detects that the screen state of the second display screen is in a second state. In the first display mode, a first picture is displayed on the first display screen. In the second state, the first display screen is divided into a first part and a second part, and the first part is shaded by the second display screen. In the second display mode, the first picture is displayed using a combination of at least part of the second display screen and the second part of the first display screen while a second picture is displayed on the at least part of the second display screen, and the second picture comprises a picture displayed on the first part of the first display screen if the second display screen is in the first state.

Preferably, the second display screen is a foldable flexible screen. Preferably, the second display screen is a foldable single-sided light emitting diode display screen or a foldable double-sided light emitting diode display screen.

Preferably, when the screen state indicates that the second display screen is in the second state, the controlling unit determines a part of the second display screen to be used for displaying according to a folding state of the second display screen, and controls to display the second picture on the determined part to be used for displaying.

Preferably, the second display screen is an upside light emitting foldable single-sided display screen. The second display screen is folded as having a first part and a second part. The second state is that the first part and the second part of the second display screen are held in a form of ridge on the first display screen and the first part of the first display screen is shaded. The controlling unit controls to display the picture originally displayed on the first part of the first display screen on the second part of the second display screen.

Preferably, the second display screen is a downside light emitting foldable single-sided display screen. The second display screen is folded as having a first part and a second part. The second state is that the first part of the second display screen is overlapped on the first part of the first display screen and an included angle between the second part of the second display screen and the second part of the first display screen is equal to or greater than 90 degrees. The controlling unit controls to display the picture originally displayed on the first part of the first display screen on the second part of the second display screen.

Preferably, the first part and the second part of the second display screen are equal or unequal.

Preferably, the second display screen is an upside light emitting foldable single-sided display screen. The second display screen is folded as including a first part, a second part and a third part with an included angle of 60 degrees between each other and the third part of the second display screen shades the first part of the first display screen. The controlling unit controls to display the picture originally displayed on the first part of the first display screen on the second part of the second display screen.

Preferably, the second display screen is a downside light emitting foldable single-sided display screen. The second display screen is folded as including a first part, a second part and a third part with an included angle of 60 degrees between each other and the first part of the second display screen shades the first part of the first display screen. The controlling unit controls to display the picture originally displayed on the first part of the first display screen on the second part of the second display screen.

Preferably, the first part, the second part and the third part of the second display screen are equal or unequal.

According to the electronic device and its display method in the embodiments of the present disclosure, multiple display modes are provided, thus diversifying the display effect of the electronic device.

BRIEF DESCRIPTION OF THE DRAWINGS

The above purpose and other purposes, features and advantages of the present disclosure will become apparent from detailed description of the embodiments of the present disclosure combined with the accompanying drawings, wherein.

DETAILED DESCRIPTION

Below are provided in detail the descriptions of an electronic device with multiple display modes and a display method of the same according to the embodiments of the present disclosure by referring to the accompanying drawings. It should be understood that the embodiments described herein are just illustrative rather than being explained as limit the scope of the present disclosure.

Referring to FIG. 1, it is an illustrative drawing of the existing pad and its screen protective cover. As shown in FIG. 1 (A), the black part is a screen protective cover. As shown in FIG. 1 (B), the screen protective cover can be folded into three folds, for example, the folded three parts form a triangular prism, but certainly do not have a function of displaying.

Figure 2:
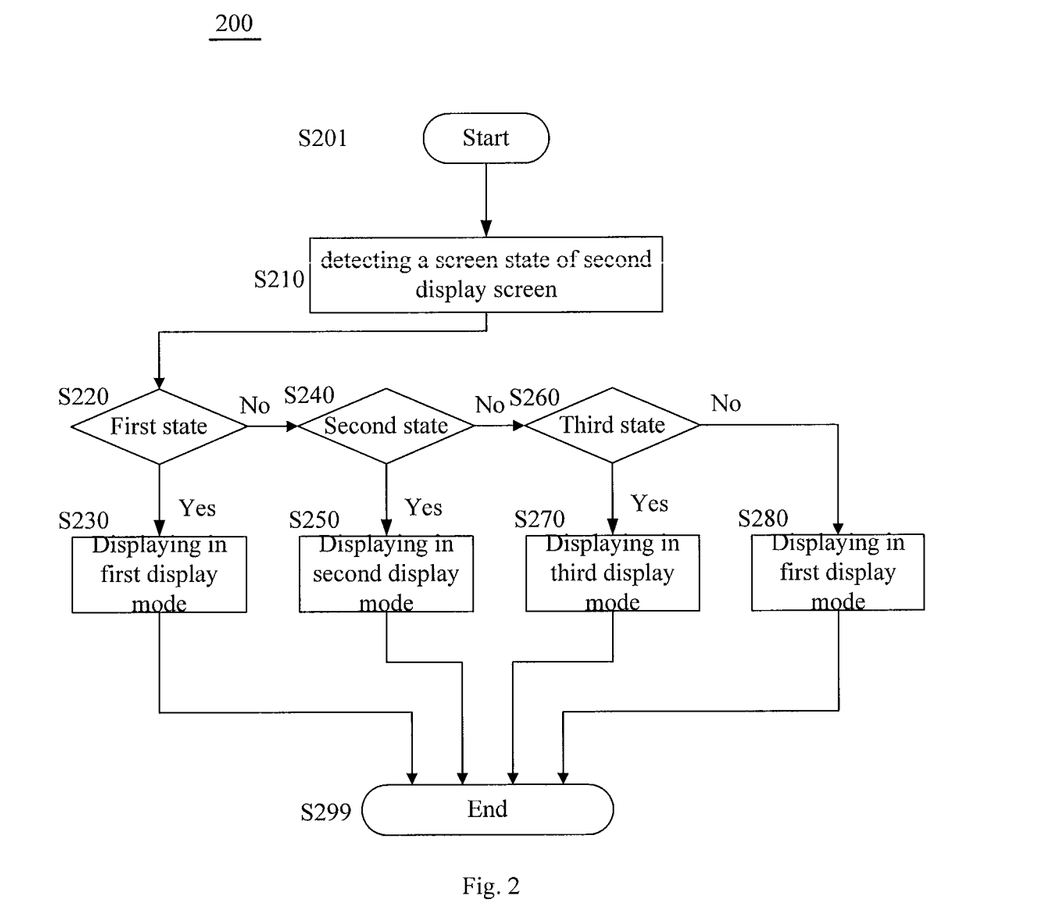
FIG. 2 is an illustrative flow chart of the display method according to the embodiments of the present disclosure.

Next, a display method 200 is described according to the embodiments of the present disclosure by referring to FIG. 2.

The display method 200 is applied to an electronic device with multiple display modes, at least having a first display mode and a second display mode. The electronic device comprises a first display screen and a second display screen. The first display screen can be a main display screen of the electronic device, and the second display screen can be a foldable display screen.

Preferably, the second display screen may be a foldable flexible screen or a foldable display screen with a fixed or unfixed folding position. In addition, the second display screen may further be a foldable single-sided display screen or a foldable double-sided display screen. For example, the second display screen may further be a foldable single-sided light emitting diode display screen or a foldable double-sided light emitting diode display screen. Preferably, the light emitting diode display screen is an organic light emitting diode display screen.

When the second display screen is a foldable single-sided display screen, it may be an upside light emitting foldable single-sided display screen or a downside light emitting foldable single-sided display screen. The upside light emitting is representative of the display surface of the second display screen and the display surface of the first display screen being of the same direction. The downside light emitting is representative of the display surface of the second display screen and the display surface of the first display screen being opposite.

The first display mode can be a display mode of the existing electronic device, i.e., merely displaying on the main display screen of the electronic device. Alternatively, the first display mode can be a display mode for independently displaying on the first display screen and the second display screen respectively.

The second display mode can be a display mode for displaying using a combination of a part of the first display screen and a part of the second display screen.

First, the display method 200 according to the embodiments of the present disclosure starts at step S201.

At step S210, detecting a screen state of the second display screen, the screen state comprises a screen position and a screen folding state, for example, the screen state of the second display screen can be detected by adopting measures of infrared ray, gyroscope, ultrasonic, electric field and a gravity sensor and so forth.

At step S220, determining whether the screen state of the second display screen is in a first state.

When it is determined at step S220 that the screen state of the second display screen is in the first state, the display method 200 according to the embodiments of the present disclosure moves to step S230 and displays in the first display mode, wherein a first picture is displayed on the first display screen.

The first state is a state in which the second display screen does not shade the first display screen.

For example, the first state can be a state in which the second display screen is unfolded and an included angle between the second display screen and the first display screen is greater or equal to 90 degrees (preferable, being greater or equal to 150 degrees). In this case, the electronic device displays in the first display mode, and the first picture is displayed on the first display screen. In addition, when the second display screen is a downside displayed single-sided display screen or a double-sided display screen, a picture being different with or the same as the first picture can be further displayed on the corresponding display surface of the second display screen.

For another example, the first state can be a state in which the second display screen is folded and a minimum included angle between each of folded surfaces of the second display screen and the first display screen is greater or equal to 90 degrees. In this case, the electronic device displays in the first display mode, and the first picture is displayed on the first display screen. In addition, when the second display screen is a single-sided display screen or a double-sided display screen, a picture being different with or the same as the first picture can be further displayed on the corresponding folded surface of the second display screen. In particular, for example, when the second display screen is a downside light emitting foldable single-sided display screen, for example, the first state can be: the second display screen is folded as having a first part and a second part, and the first part and the second part of the second display screen are held in a form of ridge outside the first display screen. A picture being different with or the same as the first picture displayed on the first display screen can be displayed on the second part of the second display screen.

As described above, in the first state, whether a picture is displayed on at least part of the second display screen cannot be defined. However, it should be noted that, in the first state, the first picture is displayed without using a combination of the second display screen and the first display screen.

When it is determined at step S220 that the screen state of the second display screen is not in the first state, the display method 200 according to the embodiments of the present disclosure moves to step S240. At step S240, it is determined whether the screen state of the second display screen is in a second state.

When it is determined at step S240 that the screen state of the second display screen is in the second state, the display method 200 according to the embodiments of the present disclosure moves to step S250 and displays in the second display mode.

The second state is a state in which a part of the first display screen is shaded by the second display screen. In the second state, the first display screen is divided into a first part and a second part, and the first part is shaded by the second display screen. In the second display mode, the first picture is displayed using a combination of at least part of the second display screen and the second part of the first display screen while a second picture is displayed on the at least part of the second display screen, and the second picture includes a picture displayed on the first part of the first display screen if the second display screen is in the first state.

When the screen state indicates that the second display screen is in the second state, a part of the second display screen to be used for displaying is determined according to a folding state of the second display screen, and the second picture is displayed on the determined part to be used for displaying.

When the second display screen is a upside light emitting foldable single-sided display screen, for example, the second state can be: the second display screen is folded as having a first part and a second part, the first part and the second part of the second display screen are held in a form of ridge on the first display screen, and the first part of the first display screen is shaded. The picture originally displayed on the first part of the first display screen is displayed on the second part of the second display screen. The first part and the second part of the second display screen can be equal or unequal.

When the second display screen is an upside light emitting foldable single-sided display screen, for example, the second state can be: the second display screen is folded as including a first part, a second part and a third part with an included angle of 60 degrees between each other and the third part shades the first part of the first display screen. The picture originally displayed on the first part of the first display screen is displayed on the second part of the second display screen. The first part, the second part and the third part of the second display screen can be equal or unequal.

In addition, when the second display screen is a downside light emitting foldable single-sided display screen. For example, the second state can be: the second display screen is folded as having a first part and a second part, and the second state is that the first part of the second display screen is overlapped on the first part of the first display screen and an included angle between the second part of the second display screen and the second part of the first display screen is equal to or greater than 90 degrees. The picture originally displayed on the first part of the first display screen is displayed on the second part of the second display screen. The first part and the second part of the second display screen can be equal or unequal.

When the second display screen is a downside light emitting foldable single-sided display screen. For example, the second state can be: the second display screen is folded as including a first part, a second part and a third part with an included angle of 60 degrees between each other, and the first part of the second display screen shades the first part of the first display screen. The picture originally displayed on the first part of the first display screen is displayed on the second part of the second display screen. The first part, the second part and the third part of the second display screen can be equal or unequal.

Alternatively, the second display screen can be a foldable double-sided display screen, for example, a double-sided light emitting diode display screen. In this case, a part of the second display screen to be used for displaying is determined according to the folding state of the second display screen, and the second picture is displayed on the determined part to be used for displaying.

The method for determining a part of the second display screen to be used for displaying according to the folding state of the second display screen is similar to the method used for the upside displayed single-sided display screen and the downside displayed single-sided display screen described above, details omitted.

Although the descriptions above give several examples of the second state of the second display screen, the present disclosure is not limited thereto. Those skilled in the art can set an appearance of the second state of the second display screen according to the needs and set a specific combined display mode, for example, the second display screen can be folded into any shape along any position rather than being limited to the two folds and three folds and so forth described above. Therefore, simple modifications according to the embodiments of the present disclosure are still included within the scope of the present disclosure.

In addition, when the second display screen is a foldable flexible screen, it can be folded into any shape along any position. In this case, a part of the second display screen to be used for displaying is determined according to the folding state of the second display screen, and the second picture is displayed on the determined part to be used for displaying.

Alternatively, the electronic device can further have a third state. When it is determined at step S240 that the screen state of the second display screen is not in the second state, the display method 200 according to the embodiments of the present disclosure moves to step S260. At step S260, it is determined whether the screen state of the second display screen is in the third state.

When it is determined at step S260 that the screen state of the second display screen is in the third state, the display method 200 according to the embodiments of the present disclosure moves to step S270 and displays in a third display mode.

Also, the third state is a state in which the second display screen does not shade the first display screen. Although both the third state and the first state are states in which the second display screen does not shade the first display screen, they are different in specific states.

For example, when the first state is that the second display screen is unfolded and an included angle between the second display screen and the first display screen is greater than or equal to 150 degrees, the third state can be that the second display screen is unfolded and the included angle between the second display screen and the first display screen is greater than or equal to 90 degrees and less than 150 degrees. In this case, the first display state is: merely displaying the first picture on the first display screen and not displaying any content on the second display screen; the third display state is: displaying the first picture on the first display screen and displaying a picture being different with or the same as the first picture on the second display screen. Alternatively, the third display state is: displaying the first picture on the second display screen, but not displaying on the first display screen or displaying a picture being different with or the same as the first picture on the first display screen.

In addition, in this case, the third state further can be a state in which the second display screen is folded and an included angle between each of folded surfaces of the second display screen and the first display screen is greater than or equal to 90 degrees.

For another example, the first state can be a state in which the second display screen is unfolded and an included angle between the second display screen and the first display screen is greater or equal to 90 degrees. The third state can be a state in which the second display screen is folded and a minimum included angle between each of folded surfaces of the second display screen and the first display screen is greater or equal to 90 degrees. In this case, the first display mode is: merely displaying the first picture on the first display screen but not displaying any content on the second display screen; the third display mode is: displaying the first picture on the first display screen and displaying a picture being different with or the same as the first picture on the corresponding folded surfaces of the second display screen. In particular, for example, when the second display screen is a downside light emitting foldable single-sided display screen, for example, the third state can be: the second display screen can be folded as having a first part and a second part, and the first part and the second part of the second display screen are held in a form of ridge outside the first display screen. A picture being different with or the same as the first picture displayed on the first display screen can be displayed on the second part of the second display screen.

When it is determined at step S260 that the screen state of the second display screen is not in the third state, the display method 200 according to the embodiments of the present disclosure moves to step S280 and it can be set according to the actual needs to display in the first display mode or not display in any mode.

Last, the display method 200 according to the embodiments of the present disclosure ends at step S299.

Figure 3:
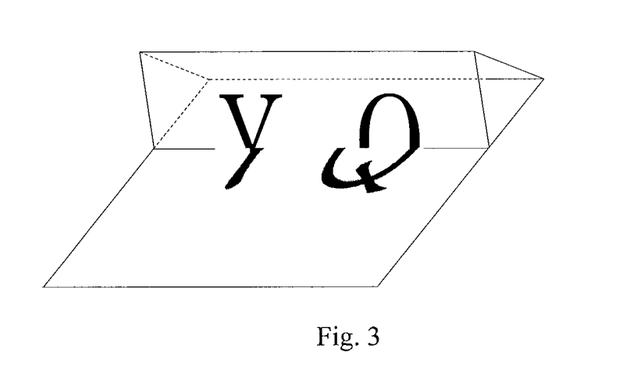
FIG. 3 is an illustrative diagram of an example of the second display mode of the electronic device according to the embodiments of the present disclosure.

As shown in FIG. 3, it is an illustrative diagram of an example of the second display mode of the electronic device according to the embodiments of the present disclosure.

In FIG. 3, the electronic device comprises a first display screen and a second display screen, wherein the first display screen is a main display screen of the electronic device, and the second display screen is a foldable display screen. For example, the second display screen is an upside light-emitted foldable single-sided display screen or a downside light-emitted foldable single-sided display screen or a foldable double-sided display screen.

The second display screen is folded as including a equal first part, second part and third part with an included angle of 60 degrees between each other and the third part shades the first part of the first display screen. The electronic device displays by using a combination of the second part of the second display screen and the second part of the first display screen. In particular, the picture originally displayed on the first part of the first display screen is displayed on the second part of the second display screen.

Figure 4:
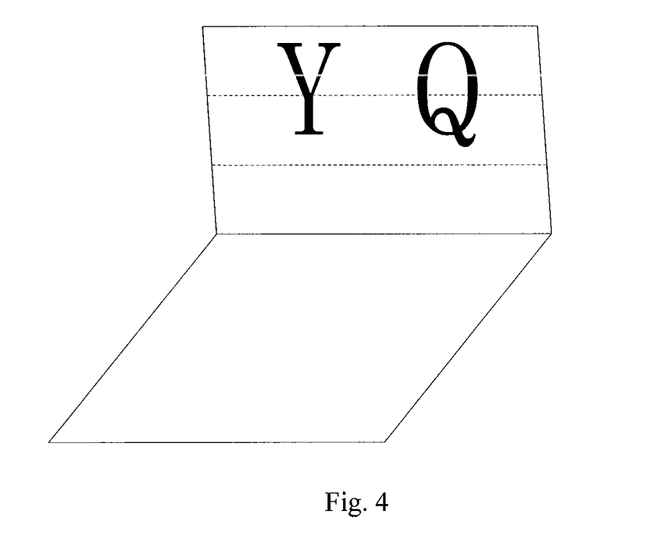
FIG. 4 is an illustrative diagram of an example of the third display mode of the electronic device according to the embodiments of the present disclosure.

As shown in FIG. 4, it is an illustrative diagram of an example of the third display mode of the electronic device according to the embodiments of the present disclosure.

In FIG. 4, the electronic device comprises a first display screen and a second display screen, wherein the first display screen is a main display screen of the electronic device, and the second display screen is a foldable display screen. For example, the second display screen is an upside light-emitted foldable single-sided display screen, a downside light-emitted foldable single-sided display screen or a foldable double-sided display screen.

The second display screen is unfolded and an included angle between the second display screen and the first display screen is equal to 90 degrees. A first picture is displayed on the second display screen while no content is displayed on the first display screen.

Figure 5:
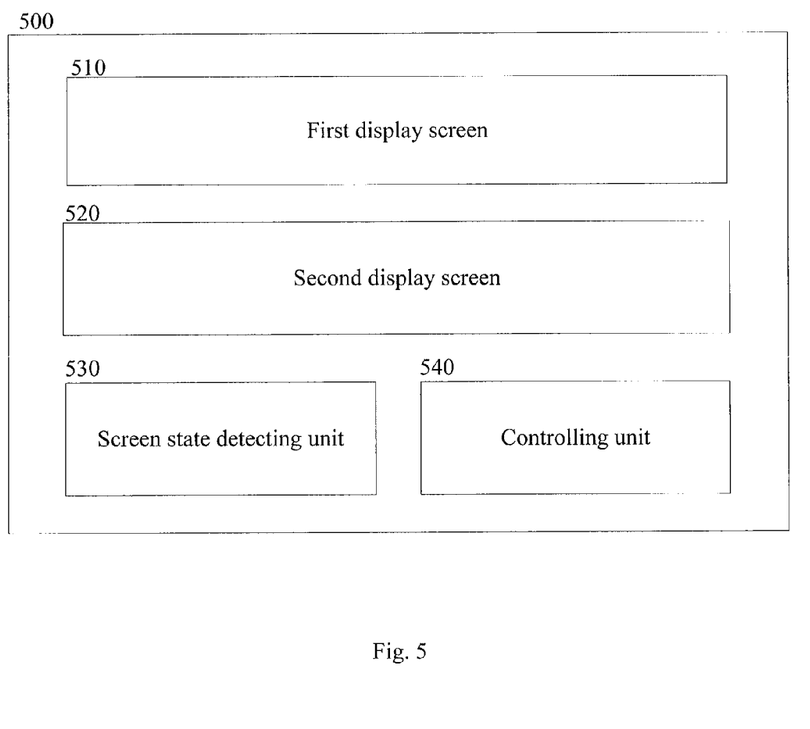
FIG. 5 is an illustrative block diagram of the electronic device according to the embodiments of the present disclosure.

Next, described is an electronic device 500 according to the embodiments of the present disclosure by referring to FIGS. 3, 4 and 5. The electronic device has a first display mode and a second display mode.

The electronic device 500 comprises: a first display screen 510; a second display screen 520, which is a foldable display screen; a screen state detection unit 530 used for detecting a screen state of the second display screen; and a controlling 540 used for controlling the electronic device to display in a first display mode when the screen state detecting unit detects that the screen state of the second display screen is in a first state and controlling the electronic device to display in a second display mode when the screen state detecting unit detects that the screen state of the second display screen is in a second state.

As described above, the second display screen may be a foldable flexible screen or a foldable display screen with a fixed or unfixed folding position. In addition, the second display screen may further be a foldable single-sided display screen or a foldable double-sided display screen. For example, the second display screen may be a foldable single-sided light emitting diode display screen or a foldable double-sided light emitting diode display screen.

When the second display screen is a foldable single-sided display screen, it can be an upside light emitting foldable single-sided display screen or a downside light emitting foldable single-sided display screen. The upside light emitting is representative of the display surface of the second display screen and the display surface of the first display screen being of the same direction. The downside light emitting is representative of the display surface of the second display screen and the display surface of the first display screen being opposite.

In the first display mode, a first picture is displayed on the first display screen. In the second mode, the first display screen is divided into a first part and a second part, and the first part is shaded by the second display screen. In the second display mode, the first picture is displayed using a combination of at least of the second display screen and the second part of the first display screen while a second picture is displayed on the at least part of the second display screen, and the second picture comprises a picture being displayed on the first part of the first display screen if the second display screen is in the first state.

When the screen state indicates that the second display screen is in the second state, the controlling unit determines a part of the second display screen to be used for displaying according to the folding state of the second display screen and controls to display the second picture on the determined part to be used for displaying.

Being similar to the descriptions above, the second display screen can be folded into two folds, three folds or any other shape. The controlling unit controls to display the second picture on the corresponding display part of the second display screen, details omitted.

A variety of display effects can be provided using the electronic device and its display method according to the embodiments of the present disclosure, thus enabling the application of the electronic device more widely.

It should be understood that the electronic device and its display device according to the embodiments of the present disclosure can be realized in various forms such as hardware, software, firmware, special-purpose processor or a combination thereof. According to the descriptions in the present disclosure, those ordinarily skilled in the art will be able to think of these and similar implementations or configurations of the present disclosure.

Although some embodiments of the present disclosure are described by referring to the accompanying drawings. However, it should be understood that the embodiments are merely illustrative rather than limitative. Those skilled in the art should understand that, various changes in forms and details can be made to these illustrative embodiments without departing from the principle and scope of the present disclosure defined in the claims and the equivalents thereof.

What is claimed is:

1. A display method applied to an electronic device having at least a first display mode and a second display mode and comprising a first display screen and a second display screen being a foldable display screen, comprising: detecting a screen state of the second display screen; displaying in the first display mode when the screen state indicates that the second display screen is in a first state, wherein a first picture is displayed on the first display screen; and displaying in the second display mode when the screen state indicates that the second display screen is in a second state, wherein the first display screen and the second display screen are separate display screens, in the second state, the first display screen is divided into a first part and a second part and the first part is shaded by the second display screen; in the second display mode, the first picture is displayed using a combination of at least part of the second display screen and the second part of the first display screen while a second picture is displayed on the at least part of the second display screen, and the second picture comprises a picture displayed on the first part of the first display screen if the second display screen is in the first state.

2. The display method as claimed in claim 1, wherein the second display screen is a foldable flexible screen.

3. The display method as claimed in claim 1, wherein the second display screen is a foldable single-sided light emitting diode display screen.

4. The display method as claimed in claim 1, wherein when the screen state indicates that the second display screen is in the second state, a part of the second display screen to be used for displaying is determined according to a folding state of the second display screen, and the second picture is displayed on the determined part to be used for displaying.

5. The display method as claimed in claim 1, wherein the second display screen is an upside light emitting foldable single-sided display screen, the second display screen is folded as having a first part and a second part, the second state is that the first part and the second part of the second display screen are held in a form of ridge on the first display screen and the first part of the first display screen is shaded, and the picture originally displayed on the first part of the first display screen is displayed on the second part of the second display screen.

6. The display method as claimed in claim 1, wherein the second display screen is a downside light emitting foldable single-sided display screen, the second display screen is folded as having a first part and a second part, the second state is that the first part of the second display screen is overlapped on the first part of the first display screen and an included angle between the second part of the second display screen and the second part of the first display screen is equal to or greater than 90 degrees, and the picture originally displayed on the first part of the first display screen is displayed on the second part of the second display screen.

7. The display method as claimed in claim 5, wherein the first part and the second part of the second display screen are equal or unequal.

8. The display method as claimed in claim 1, wherein the second display screen is an upside light emitting foldable single-sided display screen, the second display screen is folded as including a first part, a second part and a third part with an included angle of 60 degrees between each other and the third part of the second display screen shades the first part of the first display screen, and the picture originally displayed on the first part of the first display screen is displayed on the second part of the second display screen.

9. The display method as claimed in claim 1, wherein the second display screen is a downside light emitting foldable single-sided display screen, the second display screen is folded as including a first part, a second part and a third part with an included angle of 60 degrees between each other and the first part of the second display screen shades the first part of the first display screen, and the picture originally displayed on the first part of the first display screen is displayed on the second part of the second display screen.

10. The display method as claimed in claim 1, wherein the second display screen is a foldable double-sided light emitting display screen, and a part of the second display screen to be used for displaying is determined according to a folding state of the second display screen, and the second picture is displayed on the determined part to be used for displaying.

11. An electronic device having at least a first display mode and a second display mode, comprising: a first display screen; a second display screen being a foldable display screen; a screen state detecting unit used for detecting a screen state of the second display screen; and a controlling unit used for controlling the electronic device to display in the first display mode when the screen state detecting unit detects that the screen state of the second display screen is in a first state and controlling the electronic device to display in the second display mode when the screen state detecting unit detects that the screen state of the second display screen is in a second state; wherein the first display screen and the second display screen are separate display screens, in the first display mode, a first picture is displayed on the first display screen; in the second state, the first display screen is divided into a first part and a second part and the first part is shaded by the second display screen; in the second display mode, the first picture is displayed using a combination of at least part of the second display screen and the second part of the first display screen while a second picture is displayed on the at least part of the second display screen, and the second picture comprises a picture displayed on the first part of the first display screen if the second display screen is in the first state.

12. The electronic device as claimed in claim 11, wherein the second display screen is a foldable flexible screen.

13. The electronic device as claimed in claim 11, wherein the second display screen is a foldable single-sided light emitting diode display screen.

14. The electronic device as claimed in claim 11, wherein when the screen state indicates that the second display screen is in the second state, the controlling unit determines a part of the second display screen to be used for displaying according to a folding state of the second display screen, and controls to display the second picture on the determined part to be used for displaying.

15. The electronic device as claimed in claim 11, wherein the second display screen is an upside light emitting foldable single-sided display screen, the second display screen is folded as having a first part and a second part, the second state is that the first part and the second part of the second display screen are held in a form of ridge on the first display screen and the first part of the first display screen is shaded, and the controlling unit controls to display the picture originally displayed on the first part of the first display screen on the second part of the second display screen.

16. The electronic device as claimed in claim 11, wherein the second display screen is a downside light emitting foldable single-sided display screen, the second display screen is folded as having a first part and a second part, the second state is that the first part of the second display screen is overlapped on the first part of the first display screen and an included angle between the second part of the second display screen and the second part of the first display screen is equal to or greater than 90 degrees, and the controlling unit controls to display the picture originally displayed on the first part of the first display screen on the second part of the second display screen.

17. The electronic device as claimed in claim 15, wherein the first part and the second part of the second display screen are equal or unequal.

18. The electronic device as claimed in claim 11, wherein the second display screen is an upside light emitting foldable single-sided display screen, the second display screen is folded as including a first part, a second part and a third part with the included angle of 60 degrees between each other and the third part of the second display screen shades the first part of the first display screen, and the controlling unit controls to display the picture originally displayed on the first part of the first display screen on the second part of the second display screen.

19. The electronic device as claimed in claim 11, wherein the second display screen is a downside light emitting foldable single-sided display screen, the second display screen is folded as including a first part, a second part and a third part with the included angle of 60 degrees between each other and the first part of the second display screen shades the first part of the first display screen, and the controlling unit controls to display the picture originally displayed on the first part of the first display screen on the second part of the second display screen.

20. The electronic device as claimed in claim 11, wherein the second display screen is a foldable double-sided light emitting display screen, and the controlling unit controls a part of the second display screen to be used for displaying according to a folding state of the second display screen and controls to display the second picture on the determined part to be used for displaying.

* * * * *